(12) United States Patent
Hazelwood et al.

(10) Patent No.: US 6,435,621 B1
(45) Date of Patent: Aug. 20, 2002

(54) RIM EXTENSION DEVICE

(76) Inventors: Carl T. Hazelwood, 10014 Hawkins Ct., Indianapolis, IN (US) 46229; Edward L. Ross, 3824 Ridgeview Dr., Indianapolis, IN (US) 46226

( * ) Notice: Subject to any disclaimer, the term of this patent is extended or adjusted under 35 U.S.C. 154(b) by 0 days.

(21) Appl. No.: 09/747,892

(22) Filed: Dec. 26, 2000

(51) Int. Cl.[7] .................................................. B60B 7/01
(52) U.S. Cl. .................................. 301/37.38; 301/37.23
(58) Field of Search ........................... 301/37.22, 37.23, 301/37.24, 37.38, 37.371

(56) References Cited

U.S. PATENT DOCUMENTS

| | | | |
|---|---|---|---|
| 2,274,496 A | * | 2/1942 | Mulhern |
| 3,055,713 A | * | 9/1962 | Lyon |
| 3,252,738 A | | 5/1966 | Huntley |
| 3,317,247 A | * | 5/1967 | Lamme |
| 3,528,705 A | | 9/1970 | Oldroyd |
| 3,851,923 A | * | 12/1974 | Beisch |
| D257,508 S | | 11/1980 | Schinella |
| 4,344,653 A | * | 8/1982 | Sheldon |
| 4,457,561 A | | 7/1984 | Whitmarsh |
| 4,929,031 A | | 5/1990 | Shenq-Gwo |
| 5,092,661 A | * | 3/1992 | Meyers |
| 5,131,726 A | | 7/1992 | Collins |
| 5,531,508 A | * | 7/1996 | Bell, III |

\* cited by examiner

*Primary Examiner*—Russell D. Stormer

(57) ABSTRACT

A rim extension device for simulating the appearance of low profile tires. The rim extension device includes a disk. The disk has a front surface and a back surface. The disk has a hole therethrough substantially positioned in a medial portion of the disk. The hole has a diameter generally equal to a diameter of a rim of an automobile wheel. A peripheral wall is integrally coupled to and extends away from a peripheral edge of the hole. A plurality of coupling members is each securely attached to the peripheral wall and each is adapted to releasably engage the rim.

5 Claims, 3 Drawing Sheets

RIM EXTENSION DEVICE

BACKGROUND OF THE INVENTION

1. Field of the Invention

The present invention relates to rims and hubcaps and more particularly pertains to a new rim extension device for simulating the appearance of low profile tires.

2. Description of the Prior Art

The use of rims and hubcaps is known in the prior art. More specifically, rims and hub caps heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,131,726; 4,929,031; 4,457,561; 3,528,705; 3,252,738; and 257,508.

While these devices fulfill their respective, particular objectives and requirements, the aforemetioned patents do not disclose a new rim extension device. The inventive device includes a disk. The disk has a front surface and a back surface. The disk has a hole therethrough substantially positioned in a medial portion of the disk. The hole has a diameter generally equal to a diameter of a rim of an automobile wheel. A peripheral wall is integrally coupled to and extends away from a peripheral edge of the hole. A plurality of coupling members is each securely attached to the peripheral wall and each is adapted to releasably engage the rim.

In these respects, the rim extension device according to the present invention substantially departs from the conventional concepts and designs of the prior art, and in so doing provides an apparatus primarily developed for the purpose of simulating the appearance of low profile tires.

SUMMARY OF THE INVENTION

In view of the foregoing disadvantages inherent in the known types of rims and hubcaps now present in the prior art, the present invention provides a new rim extension device construction wherein the same can be utilized for simulating the appearance of low profile tires.

The general purpose of the present invention, which will be described subsequently in greater detail, is to provide a new rim extension device apparatus and method which has many of the advantages of the rims and hubcaps mentioned heretofore and many novel features that result in a new rim extension device.

To attain this, the present invention generally comprises a disk. The disk has a front surface and a back surface. The disk has a hole therethrough substantially positioned in a medial portion of the disk. The hole has a diameter generally equal to a diameter of a rim of an automobile wheel. A peripheral wall is integrally coupled to and extends away from a peripheral edge of the hole. A plurality of coupling members is each securely attached to the peripheral wall and each is adapted to releasably engage the rim.

As such, those skilled in the art will appreciate that the conception, upon which this disclosure is based, may readily be utilized as a basis for the designing of other structures, methods and systems for carrying out the several purposes of the present invention.

U.S. Patent and Trademark Office and the public generally, and especially the scientists, engineers and practitioners in the art who are not familiar with patent or legal terms or phraseology, to determine quickly from a cursory inspection the nature and essence of the technical disklosure of the application. The abstract is neither intended to define the invention of the application, which is measured by the claims, nor is it intended to be limiting as to the scope of the invention in any way.

It is therefore an object of the present invention to provide a new rim extension device apparatus and method which has many of the advantages of the rims and hubcaps mentioned heretofore and many novel features that result in a new rim extension device.

It is another object of the present invention to provide a new rim extension device which may be easily and efficiently manufactured and marketed.

It is a further object of the present invention to provide a new rim extension device which is of a durable and reliable construction.

An even further object of the present invention is to provide a new rim extension device which is susceptible of a low cost of manufacture with regard to both materials and labor, and which accordingly is then susceptible of low prices of sale to the consuming public, thereby making such rim extension device economically available to the buying public.

Still yet another object of the present invention is to provide a new rim extension device which provides in the apparatuses and methods of the prior art some of the advantages thereof, while simultaneously overcoming some of the disadvantages normally associated therewith.

Still another object of the present invention is to provide a new rim extension device for simulating the appearance of low profile tires.

Yet another object of the present invention is to provide a new rim extension device which includes a disk. The disk has a front surface and a back surface. The disk has a hole therethrough substantially positioned in a medial portion of the disk. The hole has a diameter generally equal to a diameter of a rim of an automobile wheel. A peripheral wall is integrally coupled to and extends away from a peripheral edge of the hole. A plurality of coupling members is each securely attached to the peripheral wall and each is adapted to releasably engage the rim.

Still yet another object of the present invention is to provide a new rim extension device that is retrofittable to existing rims.

Even still another object of the present invention is to provide a new rim extension device that is easily removable from the rim.

These together with other objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
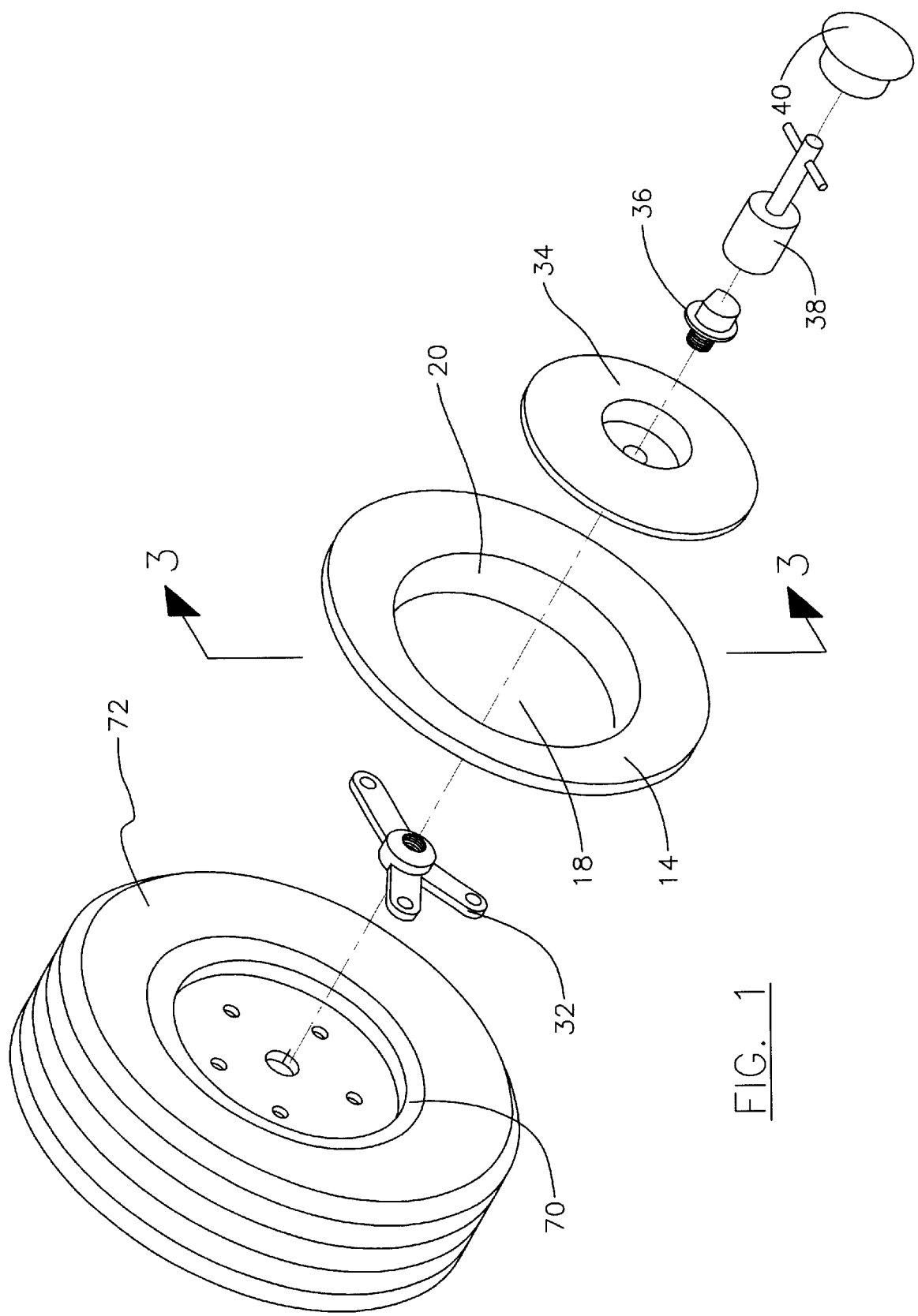
FIG. 1 is a schematic perspective view of a new rim extension device according to the present invention.
Figure 3:
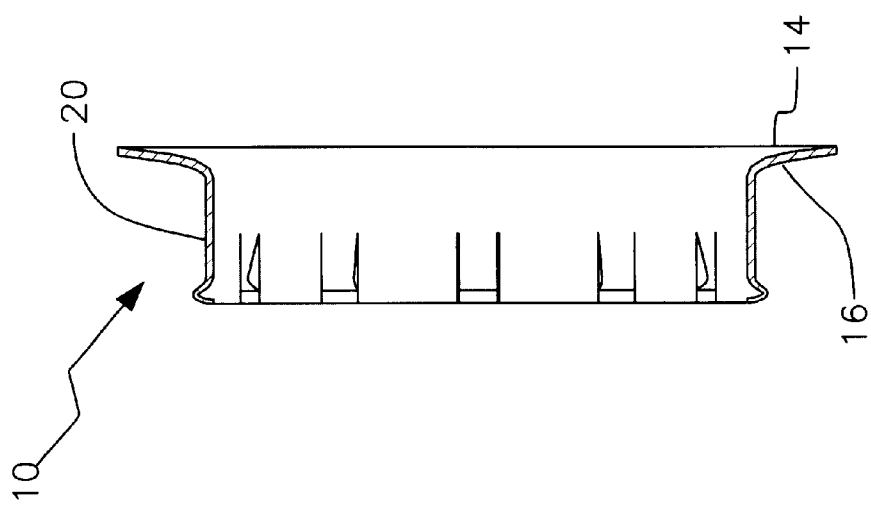
FIG. 3 is a schematic side view of the present invention.
Figure 2:
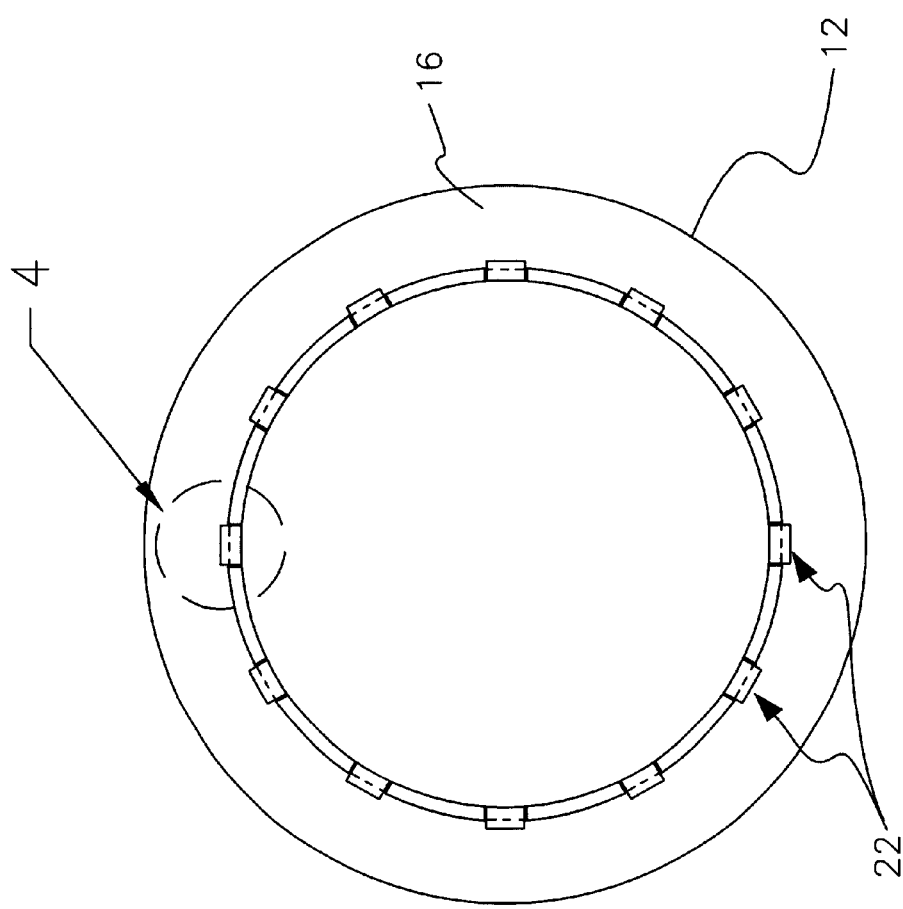
FIG. 2 is a schematic front view of the present invention.
Figure 4:
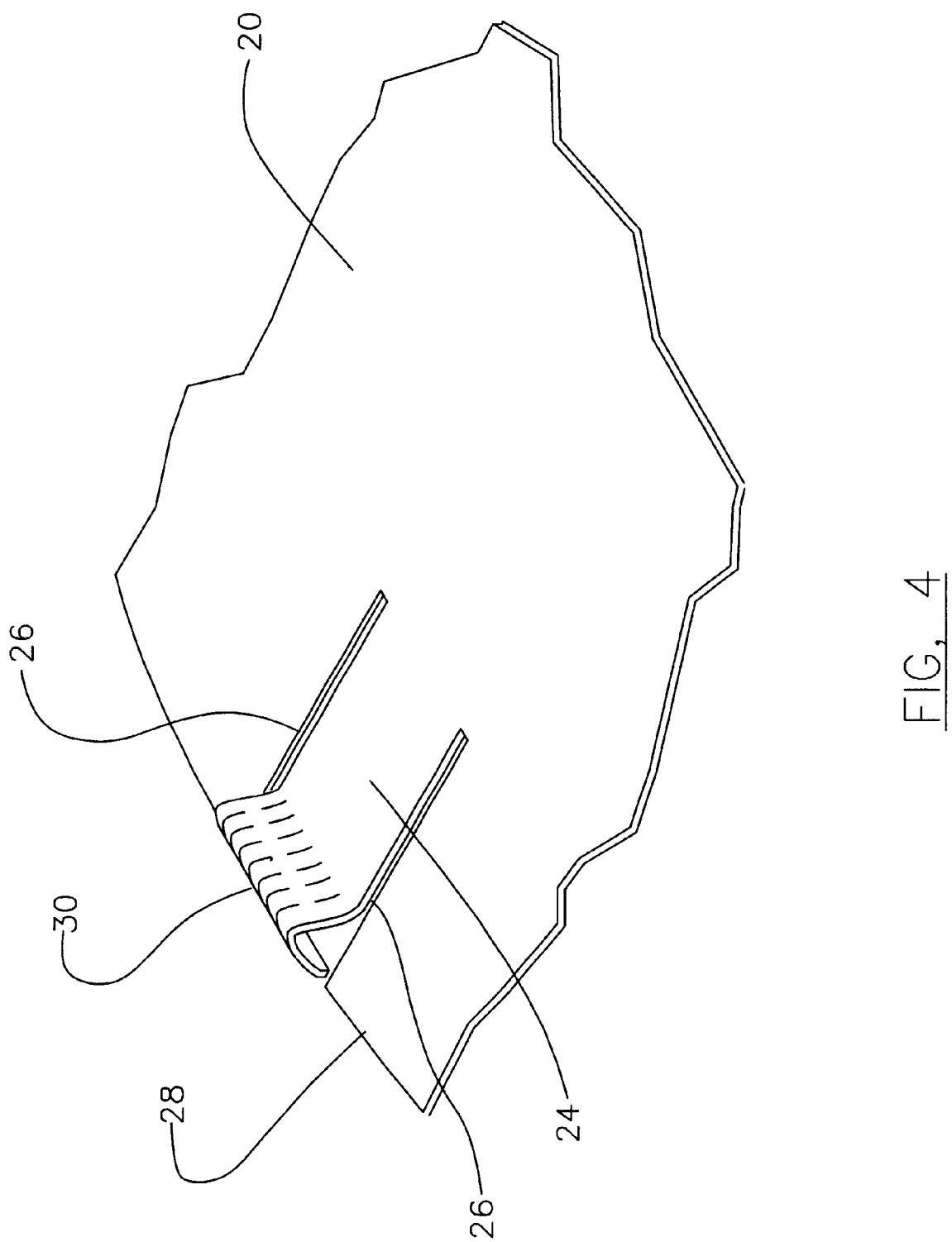
FIG. 4 is a schematic exploded view of the present invention.

With reference now to the drawings, and in particular to FIGS. 1 through 4 thereof, a new rim extension device embodying the principles and concepts of the present invention and generally designated by the reference numeral 10 will be described.

As best illustrated in FIGS. 1 through 4, the rim extension device 10 generally comprises a disk 12. The disk 12 has a front surface 14 and a back surface 16. The front surface 14 is preferably concave. The disk 12 has a hole 18 therethrough. The hole 18 is substantially positioned in a medial portion of the disk 12. The disk 12 has a diameter generally between fifteen and twenty inches. The hole 18 has a diameter generally equal to a diameter of a rim 70 of a tire 72 on which the device 10 is to placed. Ideally, the disk 12 diameter will be 2 inches to 4 inches greater than the rim 70 diameter. Conventional rims 70, for which the device is intended, have diameters equal to 13, 14, 15, and 16 inches.

A peripheral wall 20 is integrally coupled to and extends away from a peripheral edge of the hole 18. The peripheral wall 20 is adjacent to the back surface 16 of surface of the disk 12 and extends away from the front surface 14 to generally define a cylinder.

A plurality of coupling members 22 are securely attached to the peripheral wall 20 and are adapted to releasably engage the rim 70. Each of the coupling members 22 comprises a tab 24 defined by a pair of slots 26 extending into a free edge 28 of the peripheral wall 20. Each of the tabs 24 has a first portion 30 positioned adjacent to the free edge 28 of the peripheral wall 20. Each of the first portions 30 is convex such that the first portions 30 extend away from the peripheral wall 20.

In use, the device 10 is placed on the rim 70 so that tabs 24 may engage a peripheral lip of the rim 70. Additional coupling members may be used to further the look of an expanded rim. These include a base portion 32 coupled to the lug nuts of the tire 72. A hubcap 34 for positioning over the base portion 32. A fastening member 36 for fastening the hubcap 34 to the base portion 32 using a tool 38 designed for the fastening member 36 as the fastening member has a protruding member thereon for being engagedly received by a cap 40. Once on the rim 70, the device 10 gives the impression that the rim is larger to simulate a low profile tire.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An automobile rim extension device for simulating a low-profile wheel, said device being removably coupled to the rim of an automobile wheel, said device comprising:
    a central mounting member having a central portion adapted for abutting a first surface of a wheel of a vehicle, said central mounting member having a plurality of mounting arms extending outwardly from said central portion, each one of said mounting arms having a aperture extending therethrough, each one of said apertures being alignable with a stud extending from the wheel for facilitating mounting, said central mounting member having a central bore extending therethrough, said bore having threads applied thereto;
    a disk, said disk having a front surface and a back surface, said disk having a hole therethrough, said hole being substantially positioned in a medial portion of said disk;
    a peripheral wall being integrally coupled to and extending away from a peripheral edge of said hole; and
    a plurality of coupling members being securely attached to said peripheral wall and being adapted to releasably engage the rim;
    a cover member having an outer diameter approximately equal to a diameter of said hole for covering a portion of the wheel visible through said hole of said disk, said cover member having a cover aperture extending therethrough, said cover aperture being positioned centrally through said cover member, said cover aperture being alignable with said central bore when said cover member positioned within said hole of said disk; and
    a plug member having a longitudinal axis, said plug member having a plug stud portion extending therefrom, said plug stud portion being positioned such that a longitudinal axis of said plug stud portion being collinear with said longitudinal axis of said plug member, said plug stud member having threads applied thereon, said plug stud member being for threadedly engaging said central bore whereby said disk being coupled to said wheel, said plug member having a flange portion for abutting a first surface of said cover member.

2. The automobile rim extension device as in claim 1, wherein said front surface of said disk is generally concave.

3. The automobile rim extension device as in claim 1, wherein said disk has a diameter generally between fifteen inches and twenty inches.

4. The automobile rim extension device as in claim 1, wherein each of said coupling members comprises:
    a tab, each of said tabs being defined by a pair of slots extending into a free edge of said peripheral wall, each of said tabs having a first portion positioned adjacent to said free edge of said peripheral wall, each of said first portions being convex such that said first portions extend away from said peripheral wall.

5. An automobile rim extension device for simulating a low-profile wheel, said device being removably coupled to the rim of an automobile wheel, said device comprising:
    a central mounting member having a central portion adapted for abutting a first surface of a wheel of a vehicle, said central mounting member having a plurality of mounting arms extending outwardly from said central portion, each one of said mounting arms having a aperture extending therethrough, each one of said apertures being alignable with a stud extending from the wheel for facilitating mounting, said central mounting member having a central bore extending therethrough, said bore having threads applied thereto;
    a disk, said disk having a front surface and a back surface, said disk having a hole therethrough, said hole being substantially positioned in a medial portion of said disk, said disk having a diameter generally between fifteen inches and twenty inches;

a peripheral wall being integrally coupled to and extending away from a peripheral edge of said hole, said peripheral wall being adjacent to said back surface of surface of said disk;

a plurality of coupling members being securely attached to said peripheral wall and being adapted to releasably engage the rim, each of said coupling members comprising a tab, each of said tabs being defined by a pair of slots extending into a free edge of said peripheral wall, each of said tabs having a first portion positioned adjacent to said free edge of said peripheral wall, each of said first portions being convex such that said first portions extend away from said peripheral wall;

a cover member having an outer diameter approximately equal to a diameter of said hole for covering a portion of the wheel visible through said hole of said disk, said cover member having a cover aperture extending therethrough, said cover aperture being positioned centrally through said cover member, said cover aperture being alignable with said central bore when said cover member positioned within said hole of said disk; and a plug member having a longitudinal axis, said plug member having a plug stud portion extending therefrom, said plug stud portion being positioned such that a longitudinal axis of said plug stud portion being collinear with said longitudinal axis of said plug member, said plug stud member having threads applied thereon, said plug stud member being for threadedly engaging said central bore whereby said disk being coupled to said wheel, said plug member having a flange portion for abutting a first surface of said cover member.

\* \* \* \* \*